June 11, 1929.  J. C. AVAKIAN  1,716,751
WAVE CONSERVATOR
Filed March 22, 1923   2 Sheets-Sheet 1
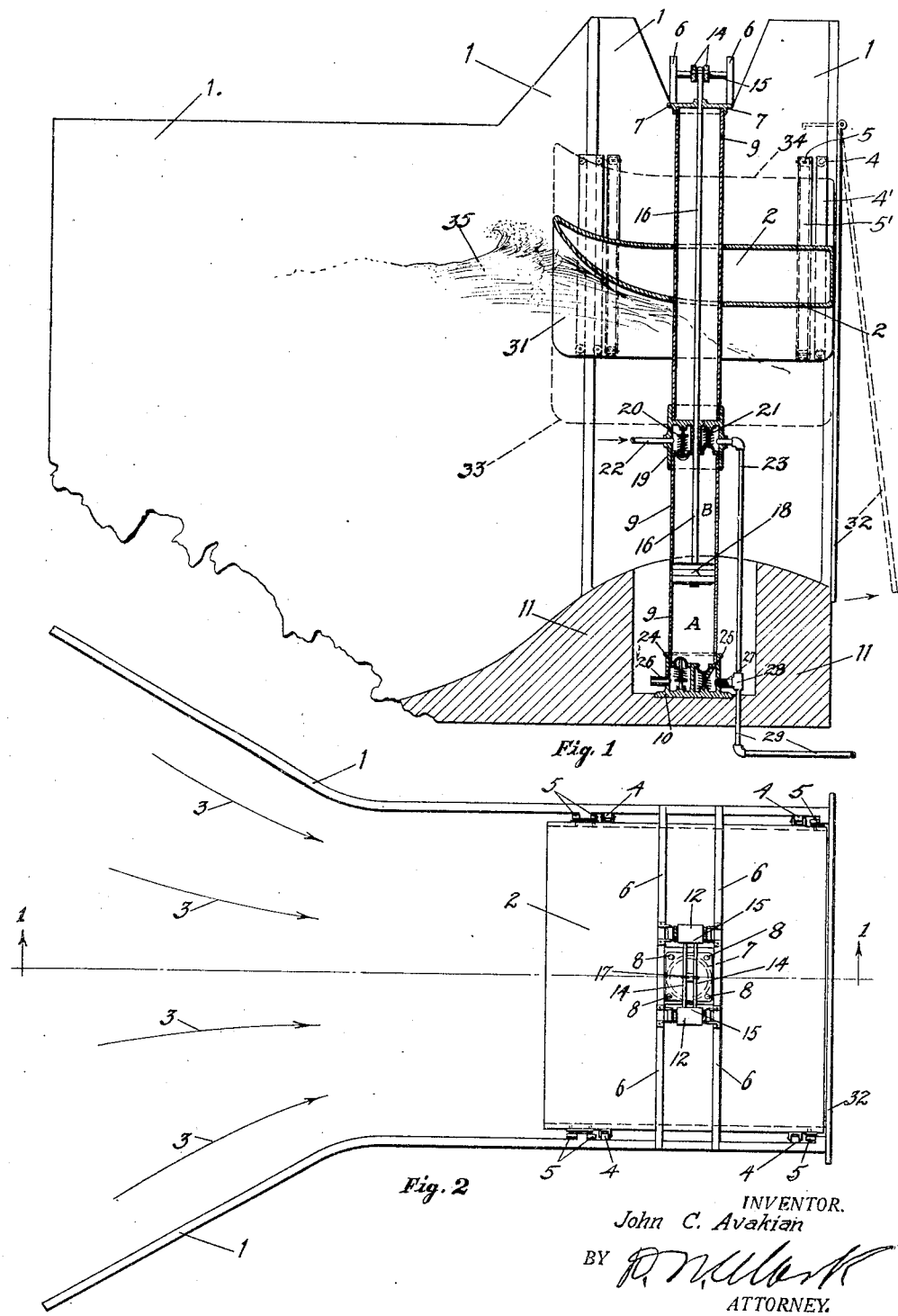
INVENTOR.
John C. Avakian
BY
ATTORNEY.

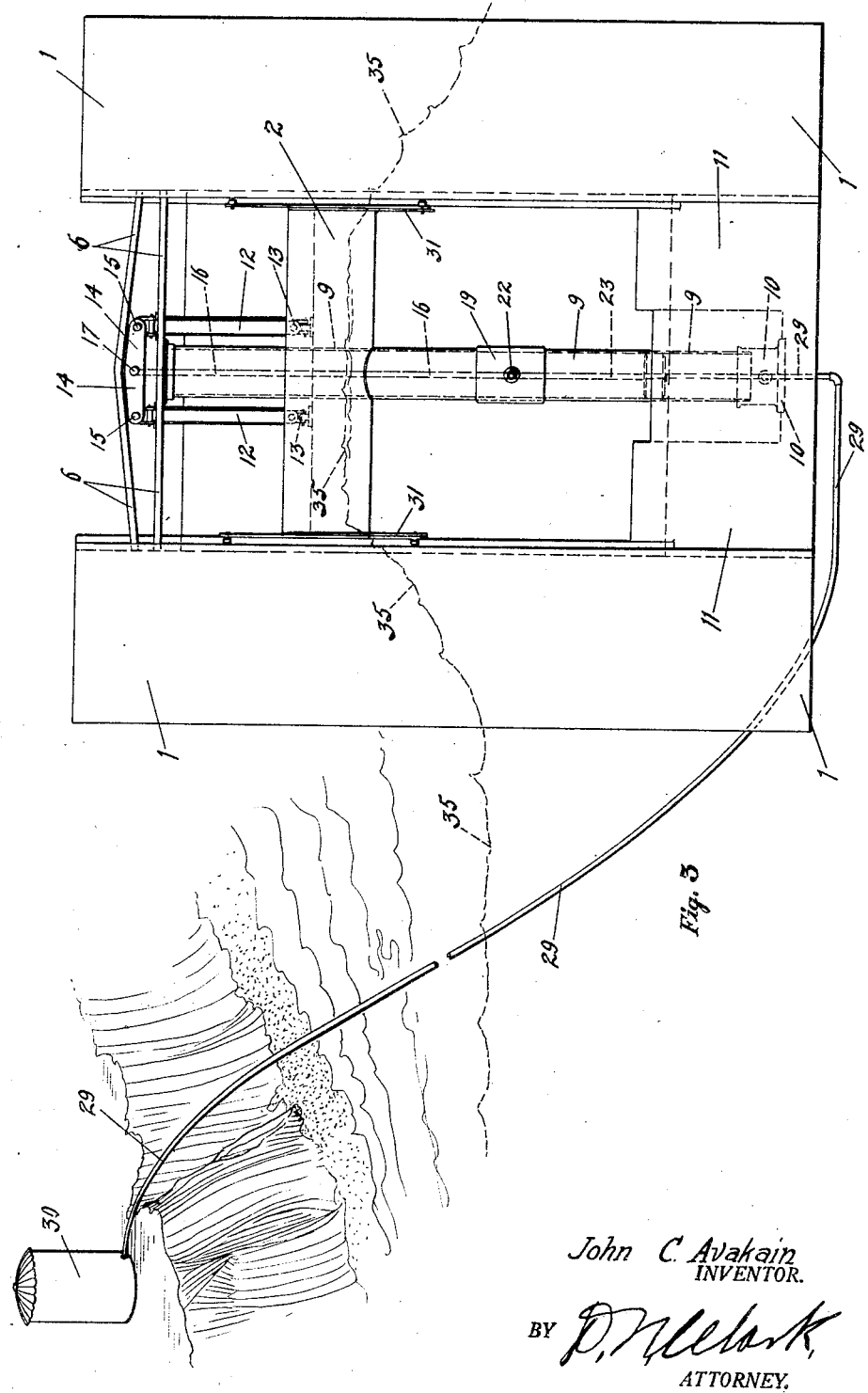

Patented June 11, 1929.

1,716,751

UNITED STATES PATENT OFFICE.

JOHN C. AVAKIAN, OF LOS ANGELES, CALIFORNIA.

WAVE CONSERVATOR.

Application filed March 22, 1923. Serial No. 626,959.

The general object of my invention is to provide an apparatus for utilizing the power of sea waves.

Various attempts have been made from time to time to obtain useful energy from the motions of the waves, but none of these efforts have hitherto met with conspicuous success. The failures of previous attempts have been due to lack of proper consideration of fundamental principles involved and it is the purpose of my invention to provide a system which is theoretically correct and which takes due consideration of the essential fundamental principles.

The specific object of my invention is to provide a combination, means, apparatus or system whereby as much as possible of all the energy expended by the various motions of the waves, as irregular and as scattered as they may be, may be efficiently taken and effectively stored in form and place whence it may be drawn regularly and readily for useful purpose. This to be done by utilizing both the undulating motions and the horizontal impacts of the waves to pump water, by a multiplicity of pumps which may be in scattered places if necessary, to an elevated reservoir to which the water may be delivered as irregularly as may be necessary and whence it may be drawn regularly.

Another object is to provide a means of converting the horizontal impact, or momentum, of the waves into the vertical movement of a floating member, which floating member, under the improvements herein shown, is so built, constructed and arranged as to accentuate the motions of the waves from their greatest subsidence to the highest crest.

Another object is to provide water guides which serve to direct water towards the floating member to accentuate the wave motion from its lowest subsidence to the highest crest, thus utilizing the greatest amplification of wave motion.

Another object is to provide a construction having a curved inclined approach in front of and beneath the floating member so as to increase the undulating motion of the waves thereby increasing the efficiency of the device.

Another object is to provide a means of permitting the inrushing water to freely pass landwardly through the device, but to be checked from its backward and seaward flow therethrough, by providing a gate, or other suitable apparatus, at the back thereof so as to require the return flow to pass around the device thus giving further amplification to the wave motions.

Another object of my invention is to provide a means whereby the receding wave in front of the floating member will create a suction so as to increase the wave subsidence thereby increasing the efficiency.

Another object is to provide a floating member with its lower surface forwardly and upwardly curved so as to produce an upward movement thereof from the horizontal movement of the incoming wave.

Another object is to provide the floating member with aprons extending below the lower surface of the same so as to prevent the lateral escape of the incoming water, thus affording the greatest confinement of the water and creating the greatest lifting thrust of the said water under the said floating member.

This application covers certain improvements in wave conservators not shown in my application filed May 31st, 1922, Serial Number 564,875.

Other objects of the invention will be apparent from the following description taken in connection with the accompanying drawings wherein:

Figure 1 is a cross-sectional view taken on line 1—1, as shown in Figure 2.

Figure 2 is a plan view of the device.

Figure 3 is a front-elevational view of the assembled device with a perspective view of the storage reservoir in the distance, showing the pipe line connecting the device to such reservoir.

In carrying out my invention, in its preferred form, embodying the improvements here shown, a framework 1 is provided. This framework rests upon the floor of the ocean, or other surrounding water, and is constructed of concrete, or other suitable material, as can be readily understood. The said framework has water guides forwardly disposed and so arranged as to impinge the inrushing waves and converge the same, as indicated by arrows 3, as they move towards the narrows adjacent to a floating member 2, as illustrated in Figure 2. Within the narrows of framework 1, as shown in Figure 2, a floating member 2 is so mounted as to be reciprocated vertically by the wave motion. The said floating member is held in operative relation to framework 1 by means of rollers 4 and sliding members 5. The said rollers 4 are mounted on spaced supports 4' which are arranged on the floor 2, while the sliding members 5 are arranged on spaced supports 5' also on the floor 2. The sliding members 5 engage the rails 5'' on the frame work, while the rollers 4 engage the sides of the frame work. At the upper part of framework 1, a truss or crossbeam 6, as shown in all figures, is provided. Attached to this crossbeam and equidistant from either side of the same framework 1, a cylinder-head 7 is attached, being rigidly held to the said crossbeam 6 by means of bolts 8, as shown in Figure 2. A cylinder 9, is attached to the cylinder head 7. The lower part of cylinder 9 rests upon a cylinder-base 10, as shown in Figures 1 and 3, and said cylinder-base in turn rests upon an approach apron 11 constructed of concrete or other suitable material. The approach 11 is preferably and suitably curved substantially as shown in cross-section in Figure 1. To the floating member 2 connecting columns 12 are suitably attached by means of flexible joints, or unions, 13, shown in Figure 3. The said columns are united to a crosshead 14 by bolts 15. To the crosshead 14 a piston-rod 16 is attached by means of crosspin 17, as shown in Figures 2 and 3. This piston rod is centrally and longitudinally located with respect to cylinder 9. A suitable opening through which the said rod may pass is provided in cylinder-head 7, as shown in Figure 1. To the lower end of the piston-rod 16 a piston 18 is attached. Attached to the cylinder 9 is a ferrule 19 comprising a cylinder-head with valves 20 and 21 provided therein and pipes 22 and 23 attached thereto, as shown in cross-section in Figure 1. The cylinder base 10 has valves 24 and 25 arranged therein which are connected to pipes 26 and 27. The pipe 27 is connected to a T 28 which connects the pipe 23 with a pipe 29 leading to a reservoir 30, as shown in Figures 1 and 3.

The valve 20 is of any suitable type disposed so as to allow water to pass through the pipe 22 into the cylinder 9 between the cylinder-head 19 and the piston 18. The valve 24 also serves as an intake valve while valves 21 and 25 are outlet valves through which water may be moved out of cylinder 9 into pipes 23 and 29, and carried through pipe 29 to the reservoir 30.

Attention is called to the fact that the floating member 2 has side aprons 31 arranged thereon as shown in Figures 1 and 3, so disposed as to trap the water against the side aprons, thus preventing the lateral escape of the water and accentuating the lifting effect produced upon the floating member by the upward thrust of the water thereunder.

Attention is also called to the fact that the under surface of said floating member 2 is curved forwardly and upwardly and slopes upwardly above the crest of the incoming waves, thus producing from the impact and momentum of the incoming waves, a vertical movement to the said floating member. At the back of the apparatus a flapping gate 32 is so arranged as to permit the water to freely flow landwardly through the apparatus. The closing of the gate prevents the water from receding seawardly through the said apparatus and thus forces the said water to pass around the device.

The lower position of the apron 31 of the float 2 is shown in dotted lines at 33, while at 34 the highest position of the top of the float is shown. The water line 35 indicates the relative position of the wave within the apparatus.

Now it will be seen that in operation, as the incoming wave 35 impinges against floating member 2, this member will be raised due to the effect produced by the guides formed of framework 1, by confinement of water within the aprons 31 attached to floating member 2, by the momentum and by the horizontal movement of the inrushing water over the approach and against the flapping gate and by the level of water within the narrows under the floating member 2. Upon a recession of the wave, the said floating member will fall by its own weight. Thus, through columns 12 and crosshead 14 attached to piston-rod 16, piston 18 will be reciprocatingly moved within the cylinder 9. When said piston 18 is moved downwardly water will be forced out of cavity "A" through valve 25, into pipe 27, through T 28, into pipe 29 and hence to reservoir 30, and at the same time water will be permitted to flow into cavity "B" through pipe 22. Now as said float moves upwardly carrying piston 18 in the opposite direction, towards piston-head 19, the valve 20 will close and valve 21 will open permitting the confined water in cavity "B" to pass outwardly through pipe 23 through T 28, pipe 29, thence to reservoir 30, as can be readily understood.

Hence it will be seen that by means of my apparatus the wave motions may be amplified and accelerated beyond the normal crest thereof and, concomitantly, below the normal subsidence thereof, thereby developing the greatest possible throw, or vertical motion, in floating member 2 and thereby producing the greatest quantity of water displacement through cylinder 9 by means of piston 18 into reservoir 30, as can be readily understood.

One of the main objects of my invention is to secure, quantitatively, the greatest amount of motion generated from the greatest amplification of the wave into the direct displacement of water, thus securing a hydrostatic source of energy moving the same to an elevation in a reservoir or into a suitable receptacle or under pressure, as the case may be, whence it may be used for the development of power, motion, energy or other purposes, either by a gradual and regular flow, such as may be required in the generation of electricity through a water turbine, or it may be suddenly released, or used irregularly, as for domestic purposes, the purpose for which the said water, so displaced, may be used forming no part of my invention, since my invention lies in the direct means, coupled with the accentuations herein described, of producing the greatest displacement of water from the greatest amplification of wave energy and motion.

Of course it will be understood that various changes, associations, arrangements and collocations of parts can be made without departing from the spirit of this invention. Moreover, attention is called to the fact that the position and curvature of approach 11 may be relatively changed as further experiments and local conditions may require, or demonstrate, in order to produce the greatest accentuating and amplifying motion therefrom by the upward thrust of waves under the floating member.

Of course it is readily understood that instead of storing water in a reservoir at an elevation, as in this specification and drawings illustrated, my device may be used for the purpose of developing pressure in a pipe line, tank or through a turbine, as the case may be, without the use of a reservoir, without departing from the spirit of this invention.

It will be further understood that the gate, or flapping gate, as herein shown, may be replaced by any form of suitable apparatus, such as pivotating shutters or the like, as can be readily understood.

Having thus described my invention in its preferred form, though without limiting myself to the particular form of illustration, since various changes and other adaptations can be made therein, the accompanying drawings being used only for the purpose of illustration, what I claim and for which I desire to secure Letters Patent are as follows:

1. In a wave energy conservator, a framework, said framework having flaring side guides thereon, a hollow impulse float member mounted to reciprocate vertically in said framework, an approach apron adjacent to the bottom of said framework, said apron having a reversely curved upper front surface, water pumping means operated by said float member, side wings on said float member, said float member having an upwardly curved front portion.

2. In a wave energy conservator, a framework, said framework having side guides thereon, a hollow impulse member mounted to reciprocate vertically in said guideways, side wings mounted on said impulse member, means to restrain lateral, forward and backward movement of said impulse member, an approach apron adjacent to the bottom of said framework, said apron having a reversely curved upper front surface, a flap valve mounted on said framework and engaging said guides and the rear of said apron to allow passage of water in one direction, pumping means operated by said float, said float member having an upwardly curved top and bottom front portion and a rear portion, said rear portion being disposed adjacent to said flap valve when the latter is in closed position.

3. In a wave energy conservator, a framework including a pair of spaced members, a pair of spaced rails arranged on each of said members, a float member, said float member having side wings thereon, supports mounted on said wings and means mounted on said supports and engaging said rails and said spaced members to restrain longitudinal and transverse movement of said float.

4. In a wave energy conservator, a framework including a pair of spaced side members, a float arranged between said side members, means to allow vertical movement of said float, an apron disposed beneath said float, said apron having a curved front face, a valve hinged to said frame work and arranged to prevent passage of water in one direction between said side members, said valve coacting with said apron.

5. In a wave energy conservator, a framework including a pair of spaced side members, a float arranged between said side members, means to allow vertical movement of said float, an apron disposed beneath said float, said apron having a reversely curved front face and having a curved rear face, a valve hinged to said frame work and arranged to prevent passage of water in one direction through said frame work, said valve coacting with said apron.

6. In a wave energy conservator, a framework, a hollow float member mounted to reciprocate vertically in said framework, means to restrain lateral and forward and backward movement of said member, an approach apron adjacent to the bottom of said framework, said apron having a reversely curved upper front surface, a flap valve mounted on said framework and engaging said guides and the rear of said apron to allow passage of water in one direction, side wings on said float member, said float member having plane parallel top and bottom rear portions, upwardly curved top and bottom front portions and a blunt rear portion, said rear portion being adapted to be disposed adjacent to said flap valve when the latter is in closed position.

7. In a wave energy conservator, a framework, said framework having side guides thereon, a hollow float member mounted to reciprocate vertically in said framework, means to restrain lateral and forward and backward movement of said member, an approach apron adjacent to the bottom of said framework, said apron having a reversely curved upper front surface and having a rear surface curved in one direction, a flap valve mounted on said framework and engaging said guides and the rear of said apron to allow passage of water in one direction, side wings on said impulse member, said restraining means being mounted on said side wings.

8. In a wave energy conservator, a hollow float member mounted to reciprocate vertically in said framework, means to restrain lateral and forward and backward movement of said member, an approach apron adjacent to the bottom of said framework, said apron having an inclined upper front surface, a flap valve mounted on said framework and engaging said framework and the rear of said apron to allow passage of water in one direction, side wings on said impulse member, said float member having plane parallel top and bottom rear portions, upwardly curved top and bottom front portions and a blunt rear portion, said rear portion being adapted to be disposed adjacent to said flap valve when the latter is in closed position.

9. In a wave energy conservator, a framework, said framework having side guides thereon, a hollow impulse member mounted to reciprocate vertically in said guideways, side wings mounted on said impulse member, means to restrain lateral, forward and backward movement of said impulse member, a cross-beam connecting said side guides, a cylinder supported by said beam, a base on which the lower end of said cylinder rests, an aproach apron adjacent to the bottom of said framework, said base being disposed in said apron, said apron having a reversely curved upper front surface, a flap valve mounted on said framework and engaging said guides and the rear of said apron to allow passage of water in one direction, water pumping means actuated by said float, said float member having an upwardly curved top and bottom front portion and a rear portion, said rear portion being disposed adjacent to said flap valve when the latter is in closed position.

10. In a wave energy conservator, a framework, said framework having side guides thereon, a hollow float member mounted to reciprocate vertically in said framework, means to restrain lateral and forward and backward movement of said member, an approach apron adjacent to the bottom of said framework, said apron having a reversely curved upper front surface and having a rear surface downwardly curved, a flap valve mounted on said framework and engaging said guides and the rear of said apron to allow passage of water in one direction, side wings on said float member, said restraining means being mounted on said side wings, said float member having an upwardly curved top and bottom front portion and a rear portion, said rear portion being adapted to be disposed adjacent to said flap valve when the latter is in closed position.

11. In a wave energy conservator, a framework, said framework having side guides thereon, a hollow float member mounted to reciprocate vertically in said guideways, side wings mounted on said float member, means to restrain lateral, forward and backward movement of said float member, a cross-beam connecting said side guides, a cylinder head secured to said cross-beam, a cylinder secured to said head, a base on which the lower end of said cylinder rests, an approach apron adjacent to the bottom of said framework, said base being disposed in said apron, said apron having a reversely curved upper front surface and having a rear surface curved in one direction, a flap valve mounted on said framework and engaging said side guides and the rear of said apron to allow passage of water in one direction, pumping means operated by said float, said float member having upwardly curved top and bottom front portion and a rear portion, said rear portion being disposed adjacent to said flap valve when the latter is in closed position.

12. In a wave energy conservator, a framework, said framework having side guides thereon, a hollow float member mounted to reciprocate vertically in said guideways, side wings mounted on said float member, a cross beam connecting said side guides, a cylinder head secured to said cross beam, a cylinder secured to said head, a base on which the lower end of said cylinder rests, an approach apron adjacent to the bottom of said framework, said base being disposed in said apron, said apron having a reversely curved upper front surface, a flap valve mounted on said framework and engaging said guides and the rear of said apron to allow passage of water in one direction, water pumping means operated by said float said float member having plane parallel top and bottom rear portions, upwardly curved top and bottom front portions and a blunt rear portion, said rear portion being disposed adjacent to said flap valve when the latter is in closed position.

13. In a wave energy conservator, a framework, said framework having side guides thereon, a hollow impulse float member mounted to reciprocate vertically in said guideways, side wings mounted on said impulse member, means to restrain lateral, forward and backward movement of said float member, said restraining means being mounted on said side wings and coacting with said framework, a cross beam connecting said side guides, a cylinder head secured to said cross beam, a cylinder secured to said head, a base on which the lower end of said cylinder rests, an approach apron adjacent to the bottom of said framework, said base being disposed in said apron, said apron having a reversely curved upper front surface and having a rear surface curved in one direction, a flap valve mounted on said framework and engaging said guides and the rear of said apron to allow passage of water in one direction, pumping means in said cylinder, means carried by said crossbeam for operating the pumping means, means connecting said pumping means with a storage device, said float member having plane parallel top and bottom rear portions, upwardly curved top and bottom front portions and a blunt rear portion, said rear portion being disposed adjacent to said flap valve when the latter is in closed position.

14. In a conservator of wave energy a floating member mounted to reciprocate vertically, a support adjacent to said floating member, said support having means thereon permitting the passage of the water through the device in a landward direction, and means on said member preventing the water from returning through the device in a seaward direction.

15. A conservator of wave energy comprising a floating member, means to mount said member to utilize the undulating wave motion, an approach arranged adjacent to said floating member said approach having portions thereon to accentuate the upward movement and thrust of the incoming waves upon the said floating member, and a valve member landwardly disposed with reference to said floating member to permit the landward passage of the water underneath the said floating member and to prevent the seaward return of the said water.

16. In a wave energy conservator a floating member mounted to reciprocate vertically, means to restrain lateral, forward and backward movement of said float member, an approach apron adjacent to said float member, said apron having a reversely curved front float surface to be in contact with the waves and having a downwardly curved rear surface.

In testimony whereof, I have signed my name to this specification.

JOHN C. AVAKIAN.